(12) United States Patent
Marier et al.

(10) Patent No.: US 12,069,405 B2
(45) Date of Patent: Aug. 20, 2024

(54) VIDEO SURVEILLANCE SYSTEM

(71) Applicant: Milestone Systems A/S, Brøndby (DK)

(72) Inventors: Keven Marier, Brøndby (DK); Barry Norton, Brøndby (DK); Dennis Schou Joergensen, Brøndby (DK)

(73) Assignee: MILESTONE SYSTEMS A/S, Brøndby (DK)

( * ) Notice: Subject to any disclaimer, the term of this patent is extended or adjusted under 35 U.S.C. 154(b) by 143 days.

(21) Appl. No.: 17/520,430

(22) Filed: Nov. 5, 2021

(65) Prior Publication Data

US 2022/0150442 A1 May 12, 2022

(30) Foreign Application Priority Data

Nov. 11, 2020 (EP) .................................... 20207009

(51) Int. Cl.
| | |
|---|---|
| *H04N 5/92* | (2006.01) |
| *H04N 23/62* | (2023.01) |
| *H04N 23/63* | (2023.01) |
| *H04N 23/661* | (2023.01) |
| *H04N 23/80* | (2023.01) |
| *H04N 23/90* | (2023.01) |

(52) U.S. Cl.
CPC ........... *H04N 5/9201* (2013.01); *H04N 23/62* (2023.01); *H04N 23/631* (2023.01); *H04N 23/661* (2023.01); *H04N 23/80* (2023.01); *H04N 23/90* (2023.01)

(58) Field of Classification Search
CPC .... H04N 5/9201; H04N 23/62; H04N 23/631; H04N 23/661; H04N 23/80; H04N 23/90; H04N 21/2187; H04N 21/4223; H04N 21/443; H04N 7/181; H04N 21/4667; H04N 5/77; H04N 21/235; H04N 21/23614
USPC ........................ 386/248; 725/105; 348/14.08
See application file for complete search history.

(56) References Cited

U.S. PATENT DOCUMENTS

| 8,429,703 B2* | 4/2013 | Kurosawa | ............... | H04N 7/185 |
| | | | | 348/211.3 |
| 2002/0116361 A1* | 8/2002 | Sullivan | ............. | H04N 21/8547 |
| (Continued) | | | | |

FOREIGN PATENT DOCUMENTS

AU 2008200965 A1 9/2009

*Primary Examiner* — Thai Q Tran
*Assistant Examiner* — Stephen R Smith
(74) *Attorney, Agent, or Firm* — Canon U.S.A., Inc. IP Division

(57) ABSTRACT

A video surveillance system comprising a video management system and one or more digital devices, each of the one or more digital devices being configured to emulate at least one physical video camera, and to send video streams and/or video metadata via a computer network to a video-receiving system, wherein the video management system comprises: an input interface for receiving one or more video streams from one or more video cameras and/or other video sources, a processing unit configured to receive one or more input video streams from the input interface, each input video stream corresponding to one of the received video streams, and to store the input video streams in a video repository, and an output interface configured to send, via a computer network, one or more of the input video streams and/or one or more of the stored video streams to one or more of the digital devices.

14 Claims, 6 Drawing Sheets

(56) References Cited

U.S. PATENT DOCUMENTS

| | | | |
|---|---|---|---|
| 2007/0107029 A1* | 5/2007 | Monroe | H04N 19/179 348/E7.086 |
| 2009/0115570 A1* | 5/2009 | Cusack, Jr. | G07C 9/37 340/5.2 |
| 2009/0189981 A1* | 7/2009 | Siann | H04N 7/183 348/143 |
| 2012/0314018 A1* | 12/2012 | Wengrovitz | H04N 7/181 348/E7.083 |
| 2013/0293709 A1* | 11/2013 | Cha | H04N 9/8205 348/143 |
| 2014/0043495 A1* | 2/2014 | Bateman | H04N 23/64 348/207.11 |
| 2015/0058709 A1 | 2/2015 | Zaletel | |
| 2015/0215583 A1 | 7/2015 | Chang | |
| 2016/0248840 A1* | 8/2016 | Bockhold | G06F 3/04842 |
| 2018/0048945 A1 | 2/2018 | Al Mohizea | |
| 2018/0324065 A1* | 11/2018 | Ritchie | H04L 43/045 |
| 2018/0341812 A1* | 11/2018 | Floor | G06V 20/42 |
| 2020/0059691 A1* | 2/2020 | Seo | H04N 21/2668 |
| 2020/0193787 A1* | 6/2020 | Jolivet | G08B 13/19682 |
| 2021/0368130 A1* | 11/2021 | Wang | G11B 27/10 |

* cited by examiner

VIDEO SURVEILLANCE SYSTEM

CROSS-REFERENCE TO RELATED APPLICATIONS

This application claims the benefit under 35 U.S.C. § 119(a)-(d) of European Patent Application No. 20207009.0, filed on Nov. 11, 2020 and titled "Video surveillance system". The above cited patent application is incorporated herein by reference in its entirety.

TECHNICAL FIELD

The present disclosure generally relates to video surveillance systems.

BACKGROUND

Modern video surveillance systems have evolved into highly complex and often heterogeneous systems comprising a large number of different peripheral devices and computer hardware elements that are tied together via a networked infrastructure, and controlled by means of advanced management software. One important component of modern video surveillance systems is a video recording and processing system that allows video streams from one or more video cameras to be received, stored and processed.

For example, US 2015/0215583 discloses a video surveillance system comprising internet protocol ("IP") cameras, a network, and cloud computing resources having a management resource, a video storage resource, and a viewing and control resource. The IP cameras and cloud computing resources are connected via the network. The IP cameras independently access each of the cloud computing resources. An application software of a device connected to the network identifies one or more objects of interest from the video data of the IP cameras for extraction.

A video management system, also known as video management software or a video management server, is a component of a camera surveillance system that provides video management services, such as one or more of the following: collecting one or more video streams from one or more video cameras, storing the received one or more video streams to a storage device and providing an interface to view the received one or more live video streams and/or to access one or more stored video streams.

In this rapidly evolving field, surveillance systems and, in particular, video management systems therefore face the constant challenge to support, handle and exploit a great variety of different hardware devices from a large number of different suppliers, wherein each hardware device usually comes with its own driver components and/or interface, such as its own application programming interface (API).

Moreover, it is generally desirable that surveillance systems and, in particular, video management systems are versatile and can be used in different types of applications which may impose different demands or requirements. Moreover, the demands and requirements imposed in a surveillance system may change over time.

On this background, it is generally desirable to provide a video managing system for a video surveillance system that is flexible and facilitates easy adaptation of the video surveillance system to different needs and/or easy adaptation to capabilities of different hardware components.

SUMMARY

It is an object of at least some aspect described in the present disclosure to solve one or more of the issues identified above and/or other issues associated with existing video surveillance systems, or at least to provide an alternative to known systems.

According to one aspect, disclosed herein are embodiments of a video surveillance system comprising a video management system and one or more computer-implemented digital devices. Each of the one or more digital devices is configured to emulate at least one physical video camera for sending video streams and/or video metadata via a computer network to a video-receiving system, which may be remote from the digital device. According to the present disclosure, each of the one or more digital devices is configured to emulate a physical video camera by providing one or more interfaces allowing the video-receiving system to communicate with that digital device as if that digital device were a physical video camera by retrieving video streams and/or making camera settings. Each of the one or more digital devices is further configured to output, via the one or more interfaces, the said video streams and/or video metadata to the said video-receiving system. The video management system comprises:

an input interface for receiving one or more video streams from respective one or more video cameras and/or from one or more other video sources, a processing unit configured to receive one or more input video streams from the input interface, each input video stream corresponding to a respective one of the received video streams, and to store the input video streams in a video repository, and an output interface configured to send, via a computer network, one or more of the input video streams and/or one or more of the stored video streams to one or more of the digital devices.

Accordingly, the surveillance system allows the creation of customized processed video streams and/or metadata in a flexible manner, even for video streams captured by video cameras without advanced capabilities. Moreover, when the digital device provides an execution environment for user-installed application programs, the type of video processing may easily be adapted at any time, in particular by installing the desired application programs on the digital device. Moreover, embodiments of the digital device may be implemented by a digital device data processing system separate and remote from a physical video camera. In particular, some embodiments of a digital device may be integrated into a video management system while other embodiments of a digital device may be implemented by a digital device data processing system remote from the video management data processing system that implements the video management system. For example, some embodiments of a digital device may be executed on a remote computing infrastructure, remote from the video management system data processing system, such as on a cloud infrastructure. Accordingly, the number of digital devices and the number and complexity of application programs hosted by the digital devices is easily scalable and not restricted by hardware limitations of the video cameras or by the available computing power of the video management data processing system that executes the video management software. Generally, the video camera may be a surveillance camera, such as an IP surveillance camera, networked surveillance camera or the like, or another type of video camera.

The video management system may be implemented as a video management computer program executed on a video management data processing system. In particular, the video management system may comprise a video recording server, which may be implemented as a recording server process executed by the video management data processing system, where the recording server is configured to receive and store the input video streams and to send the input video streams to at least one of the one or more digital devices.

To this end, the video management data processing system may comprise one or more processing units and memory having stored thereon program code configured, when executed by the one or more processing units, to implement the video management system, in particular the recording server process. The data processing system implementing the video management system is often, though not necessarily, installed on the premises of the facility where the video cameras are located, thus avoiding the need for transmitting the video streams from the cameras over public communications networks. In some embodiments, the video management data processing system is connected to the one or more video cameras via a local computer network, such as a local area network, thus facilitating large data volumes to be efficiently received by the video management system, in particular without depending on an external internet connection.

The video streams received by the video management system digital video streams, e.g. in the form of respective streams of video data. The digital video stream may be an encoded video stream, encoded using a suitable video encoding protocol such as H.264 or H.265. The video management system may store the input video streams as encoded video streams. Similarly, the output interface may provide the input video streams and/or previously stored video streams as suitably encoded video streams.

The video repository may be a suitable data storage device for storing media content, in particular video content. In particular, the video repository may be a suitable media database, in particular a video database. The video repository may be implemented as part of the video management data processing system or it may be implemented by a separate data processing system in communicative connection with the video management data processing system, in particular with the recording server.

In some embodiments, the video management system is configured to send the input video streams to at least one of the one or more digital devices, such as one or more remote digital devices, and to concurrently store the input video streams in the video repository, i.e. the digital devices may receive and process the video streams in quasi-real time as a live video feed. Accordingly, the video streams and/or metadata generated by the digital device may be fed into a video-receiving system in quasi real-time, e.g. for quasi-real-time or live viewing by an operator.

According to another aspect, disclosed herein are embodiments of a computer-implemented digital device configured to emulate at least one physical video camera for sending video streams and/or video metadata via a computer network to a video-receiving system, which may be remote from the digital device. Accordingly, the digital device is configured to operate as a video source, such as a video server, for sending video streams and/or video metadata via a computer network to a video-receiving system. The digital device may implement a video pipeline for processing the received video stream. The processing may result in a processed video stream and/or video metadata.

The computer-implemented digital device emulates at least one physical video camera, i.e. the digital device is configured to provide one or more interfaces allowing external systems (e.g. a video-receiving system as mentioned above) to communicate with the digital device as if the digital device were a physical video camera by retrieving video streams and/or making camera settings. The digital device is thus configured/constructed to give the appearance to a video-receiving system of being a physical video camera. In particular, embodiments of the computer-implemented digital device comprises one or more interfaces that are accessible to a video-receiving system, which may be remote from the computer-implemented digital device, such that the video-receiving system can interact with the computer-implemented digital device in the same way as with a physical video camera. To the video-receiving system, the computer-implemented digital device may be indistinguishable from a physical video camera. For example, the digital device may be recognizable by the video-receiving system as a video camera on a computer network. It will be appreciated, however, that the digital device does not comprise any optical system, image sensor or the like, for optically capturing video images. Instead, the digital device is configured to receive a video stream, in particular from the video management system. The digital device is configured to output, via the one or more interfaces, the received video stream or a processed version of the received video stream, such that the video-receiving system receives the, optionally processed, video stream from the digital device in the same way as the video-receiving system would receive a video stream from a physical video camera. Accordingly, the computer-implemented digital device may be considered a virtual digital device. The digital device may further output video metadata.

According to the present disclosure, one or more physical video cameras may be tethered to the same digital device. For instance, several physical video cameras tethered to the same digital device and looking at the same target area (or scene) may advantageously be provided with different capabilities, e.g. have different fields of view or different resolutions. One of these physical video cameras may for instance have a narrower field of view as compared to another physical video camera connected to the same digital device. More generally speaking, these physical video cameras may be operated for independent reasons such as for displaying different and/or complementary views or details of the target area. In such a case where several physical video cameras are tethered to the same digital device, that digital device may advantageously be configured to provide the same execution environment for one or more user-installed application programs, thus allowing to process at least a part of the received video streams with the same one or more user-installed applications programs (i.e. resulting in processed video streams and/or in video metadata associated with the received video streams). For instance, a digital device may provide an execution environment for a user-installed application program configured to carry out facial recognition in the video streams received from the different physical video cameras tethered to that digital device.

Conversely, one physical video camera may be tethered to several digital devices. In other words, a physical video camera may be emulated several times. For instance, the video stream received from that physical video camera may be processed by a first application program on a first digital device to detect human faces in the received video stream, and the same received video stream may be processed by a second application program on a second digital device to detect vehicles in the received video stream. Alternatively, or additionally, a received video stream may be processed multiple times on the same digital device and/or may further be processed on another digital device. For instance, a processed video stream in which a human face has been detected by a user-installed application program may further be processed to carry out facial recognition on the detected human face, for instance on another digital device and/or with another user-installed application program.

Each of the one or more digital devices according to the present disclosure operates independently from the one or more physical video cameras to which it is tethered to (or which is/are tethered to them). In other words, each digital device takes on attributes of the one or more physical video cameras to which that digital device is tethered to (or which are tethered to that digital device) but has a life of its own. The said one or more digital devices are thus not to be confused with virtualized video cameras or virtual video cameras, as they are tethered to physical video cameras.

Each digital device operates based on one or more video streams received from one or more physical video cameras and provides one or more interfaces allowing a video-receiving system to communicate with that digital device as if that digital device were that or these physical video cameras by retrieving video streams and/or making camera settings. Each of the one or more digital devices is further configured to output, via the one or more interfaces, the said video streams and/or video metadata to the said video-receiving system.

The digital device may be configured to emulate at least one app-enabled camera. For the purpose of the present description, the term app-enabled camera is intended to refer to a video camera, in particular a physical video camera, comprising a processing unit on which one or more software application programs can be installed for providing the video camera with additional digital capabilities. This may allow to extend the lifecycle of physical video cameras which would otherwise be seen as obsolete. The app-enabled camera may be an IP camera. In particular, the term app-enabled camera encompasses a camera on which such application programs can be installed at any time after manufacturing, e.g. by a user of the video camera. To this end, an app-enabled camera may comprise a processing unit and a suitable operating system, e.g. an Android-based operating system, configured to provide an execution environment for facilitating execution of user-installed application programs, in particular application programs configured, when executed by the processing unit, to cause the processing unit to process a video stream recorded by the video camera and/or to provide other functionality to the camera.

Accordingly, the digital device may comprise a suitable operating system, e.g. an Android-based operating system, configured to provide an execution environment for facilitating execution of application programs, in particular user-installed application programs. The application programs may be configured, when executed by a data processing system, in particular a cloud-based processing resource, to cause the digital device to process a video stream received from the video management system so as to generate a processed video stream and/or video metadata derived from the received and/or processed video stream. The digital device is configured to output the processed video stream and/or the video metadata to a video-receiving system, e.g. to a remote data processing system, such as to the video management system or to another video-receiving system for receiving video streams and/or associated video metadata.

For the purpose of the present description, the term digital device as used herein is intend to refer to a computer program configured, when executed by a digital device data processing system, to emulate at least one physical electronic device, in particular to emulate at least one physical video camera, such as at least one physical IP camera. The digital device may be a cloud-based digital device. The term cloud-based digital device as used herein is intend to refer to a computer program configured, when executed by a cloud-based computing resource of a cloud-based computing architecture, to emulate at least one physical electronic device, in particular to emulate at least one physical video camera.

In particular, embodiments of the digital device disclosed herein are configured to emulate at least one physical app-enabled video camera. To this end, the digital device is configured to:
  receive a video stream from a video management system,
  provide an execution environment for one or more user-installed application programs, the execution environment allowing the one or more user-installed application programs to process at least a part of the received video stream resulting in a processed video stream and/or in video metadata associated with the received video stream, and to
  output the processed video stream and/or the video metadata via the one or more interfaces to the said video-receiving system.

To this end, the digital device data processing system may comprise a processing unit and memory having stored thereon program code configured, when executed by the processing unit, to implement the digital device. It may be appreciated that a single digital device data processing system may implement one or more digital devices. Similarly, it will be appreciated that different digital devices may be implemented by a single data processing system or by respective, separate digital device data processing systems. The one or more digital device data processing systems may thus be communicatively connected to the video management data processing system e.g. via a computer network. In some embodiments, one or more cloud-based digital devices may be implemented by one or more virtual machines, e.g. in a cloud architecture. The present disclosure refers to application programs being deployed on the digital device or being executed by the digital device. It will be appreciated that this is intended to refer to the application program being executed by the digital device data processing system implementing the digital device, e.g. by a cloud computing architecture on which a cloud-based digital device is executed.

Generally, a processing unit may include a suitably programmed microprocessor or any other circuit and/or device suitably adapted to perform the data- and/or signal-processing functions described herein. In particular, the processing unit may comprise a general- or special-purpose programmable microprocessor, such as a central processing unit (CPU), a digital signal processing unit (DSP), an application specific integrated circuit (ASIC), a programmable logic array (PLA), a field programmable gate array (FPGA), a Graphical Processing Unit (GPU), a special purpose electronic circuit, etc., or a combination thereof. To this end, the processing unit may be suitably programmed by software and/or firmware configured to be executed by the processing unit. The software and/or firmware may be stored on a suitable memory of the processing unit. In some embodiments, the processing unit is a suitably programmed computer or other data processing system.

In some embodiments, at least one of the one or more digital devices comprises a video decoder module configured to decode the received video stream. The decoder module may be configured to decode video streams encoded using a suitable video encoding standard, such as the H.264 standard or the H.265 standard. The digital device may be configured to provide an application interface and/or other services allowing one or more application programs deployed on by the digital device to receive at least a part, e.g. individual frames, of the decoded video stream. The application interface may further allow one or more application programs executed by the digital device to return a processed video stream, e.g. individual frames of a processed video stream. In some embodiments, at least one of the one or more digital devices comprises a video encoder module configured to re-encode the received video stream and/or the processed video stream. The encoder module may be configured to encode the video stream according to a suitable video encoding standard, such as the H.264 standard or the H.265 standard.

In some embodiments, at least one of the one or more digital devices comprises a communications module configured to establish a video tunnel or other suitable communications session with the video management system, and to receive a video stream via the video tunnel or otherwise within the context of the established communications session. In some embodiments, the digital device is configured to transmit the processed video stream and/or associated video metadata to the video management system, in particular to return the processed video stream and/or associated video metadata to the video management system via said established video tunnel or otherwise within the context of the same established communications session during which the original video stream has been received by the digital device.

The digital device is configured to emulate at least one app-enabled camera. Accordingly, the digital device may comprise a video server component configured to operate as a video server recognisable by a video-receiving client component, which may be remote from the digital device, and configured to provide a video stream and/or metadata to the video client component. The video server component may be integrated into the communications module. The video server component may be configured to implement a network control protocol configured for use in communications systems to control streaming media servers, such as the Real Time Streaming Protocol (RTSP). Alternatively or additionally, the video server component may be configured to operate according to a version of the Open Network Video Interface Forum (ONVIF) Core specification, such as the ONVIF Core specification version 2.4. Additionally, the server component may be configured to operate according to a version of one or more ONVIF Profiles.

It will be appreciated that the digital device is distinguished from a physical video camera in that a physical video camera comprises an image sensor. Accordingly, any video processing performed by a physical video camera, e.g. by an app-enabled physical video camera, is performed on the video stream captured by the image sensor. Embodiments of the digital device disclosed herein, on the other hand, receive a video stream, in particular an encoded video stream, via a computer network from an external data processing system, and process the received video stream, in particular decode the received video stream and process the decoded video stream.

The digital device may be configured to host a variety of different application programs. Examples of application programs include application programs that process at least a part of a video stream, e.g. one or more frames of a video stream, so as to create metadata associated with the video stream, e.g. metadata indicative of one or more detected properties or features of the video stream, e.g. so as to perform object detection, event detection, motion detection and/or the like. Some or more of these processing techniques may comprise the application of machine learning techniques. One example of an application program may add GPS location data to a place within a field of view depicted in the video, e.g. so as to identify a position of a crime. Other examples of video processing may include detecting or otherwise adding metadata regarding a crime, such as creating data from various cameras stitched together. Accordingly, in some embodiments, a digital device may be configured to receive multiple video streams, and generate metadata based on a combination of the multiple videos.

Other examples of application programs include an application program that processes at least a part of a video stream so as to modify the video stream, i.e. so as to create at least a part of a processed video stream. Examples of such processing include a process for image/video enhancement and/or the like. For example, an application program may upscale a low resolution video to a higher resolution video and/or enhance image quality and/or create super resolution from poor quality video. This allows to use or extend the lifecycle of previous generation cameras, such as VGA cameras.

Alternatively, or additionally, the said one or more digital devices may upscale one or more low resolution videos to higher resolution videos and/or enhance image quality and/or create super resolution from poor quality videos and then provide one or more enhanced videos to one or more user-installed application programs. In other words, a digital device according to the present disclosure may run super resolution on raw camera data prior to sending one or more processed video streams to one or more user-installed application programs.

At least some embodiments of the video management system disclosed herein are capable of receiving video streams from a variety of different cameras. Accordingly, in some embodiments, the input interface of the video management system comprises one or more camera drivers, each camera driver configured to receive video streams from at least one type of video camera. In some embodiments, each camera driver is configured to add one or more time stamps to the received video stream so as to provide the input video stream as a time-stamped input video stream. The video management system may then be configured to store the input video stream with the added time stamp and to use the added time stamp as a canonical time stamp for the purpose of the subsequent processing.

In some embodiments, the video management system is configured to selectively feed a currently received input video stream or a previously stored video stream, i.e. a video stream previously stored in the video repository, to the digital device. Feeding a previously stored video stream to a digital device may comprise replacing the canonical time stamp with a modified time stamp, the modified time stamp corresponding to a current time, i.e. the time at which the video stream is sent to the digital device. Accordingly, the video management system allows the digital device to emulate at least one physical video camera that captures a video at the current time, i.e. in real-time or quasi-real time.

In some embodiments, the video management system further comprises an index server for indexing the metadata stored in a metadata repository, in particular a metadata database. Accordingly efficient subsequent retrieval is of the stored metadata is facilitated.

The video management system, in particular the recording server, is configured to receive a video stream and/or associated metadata, from one or more of the digital devices. In some embodiments, the video management system is configured to determine whether a received processed video stream is received from a digital device and whether the received processed video stream corresponds to—i.e. is a processed version of—a previously stored video stream, and to selectively add a time stamp to the received processed video stream and/or the received metadata, the added time stamp corresponding to the canonical time stamp of the previously stored video stream. In particular, detecting whether the received processed video stream corresponds to a previously stored video stream may comprise determining whether the processed video and/or metadata is received responsive to the video management system having fed a previously stored video stream with a modified time stamp to the digital device. The video management system may e.g. make this determination when the video management system has received the processed video stream as part of the same session, e.g. via the same video tunnel, via which a previously stored video with a modified time stamp has been fed to the digital device.

It will be appreciated that the video management system and/or the digital device may receive and process additional media streams and/or additional sensor data, such as audio signals, radar signals, LIDAR signals etc. It will further be appreciated that the video stream may be a video stream indicative of video images of visible light and/or video images indicative of radiation at non-visible wavelengths, such as thermal images, e.g. images captured by an SWIR camera, etc. The digital device may provide such additional media streams and/or sensor data to the application programs hosted by the digital device so as to allow the application program to process the additional media streams in combination with a video stream.

The video management system may be configured to transmit video streams to the digital device via a suitable computer network, such as the internet.

The present disclosure relates to different aspects, including the video surveillance system described above and in the following, further methods, systems, devices and product means, each yielding one or more of the benefits and advantages described in connection with one or more of the other aspects, and each having one or more embodiments corresponding to the embodiments described in connection with one or more of the other aspects described herein and/or as disclosed in the appended claims.

In particular, the present disclosure further relates to a computer-implemented video management process, comprising:
  receiving one or more video streams from respective one or more video cameras and/or other video sources,
  storing one or more input video streams, each input video stream corresponding to a respective one of the received video streams, in a video repository, and
  sending from a video management system, via a computer network, one or more of the input video streams and/or one or more of the stored video streams to one or more digital devices, each of the one or more digital devices being configured to emulate at least one physical video camera, and to send video streams and/or video metadata via a computer network to a video-receiving system, which may be remote from the digital device,
wherein each of the one or more digital devices is configured to emulate a physical video camera by providing one or more interfaces allowing the video-receiving system to communicate with that digital device as if that digital device were a physical video camera by retrieving video streams and/or making camera settings and wherein each of the one or more digital devices is further configured to output, via the one or more interfaces, the said video streams and/or video metadata to the said video-receiving system.

It is noted that features of the various embodiments of a computer-implemented method described above and in the following may be implemented at least in part in software or firmware and carried out on a data processing system or other processing unit caused by the execution of program code means such as computer-executable instructions. Here and in the following, the term processing unit comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), Graphical Processing Units (GPU), special purpose electronic circuits, etc., or a combination thereof.

The present disclosure further relates to embodiments of a computer program configured to cause a data processing system to perform the acts of the computer-implemented method described above and in the following. A computer program may comprise program code means adapted to cause a data processing system to perform the acts of the computer-implemented method disclosed above and in the following when the program code means are executed on the data processing system. The computer program may be stored on a computer-readable storage medium, in particular a non-transient storage medium, or embodied as a data signal. The non-transient storage medium may comprise any suitable circuitry or device for storing data, such as a RAM, a ROM, an EPROM, EEPROM, flash memory, magnetic or optical storage device, such as a CD ROM, a DVD, a hard disk, and/or the like.

BRIEF DESCRIPTION OF THE DRAWINGS

The above and other aspects will be apparent and elucidated from the embodiments described in the following with reference to the drawing in which.

DETAILED DESCRIPTION

Figure 1:
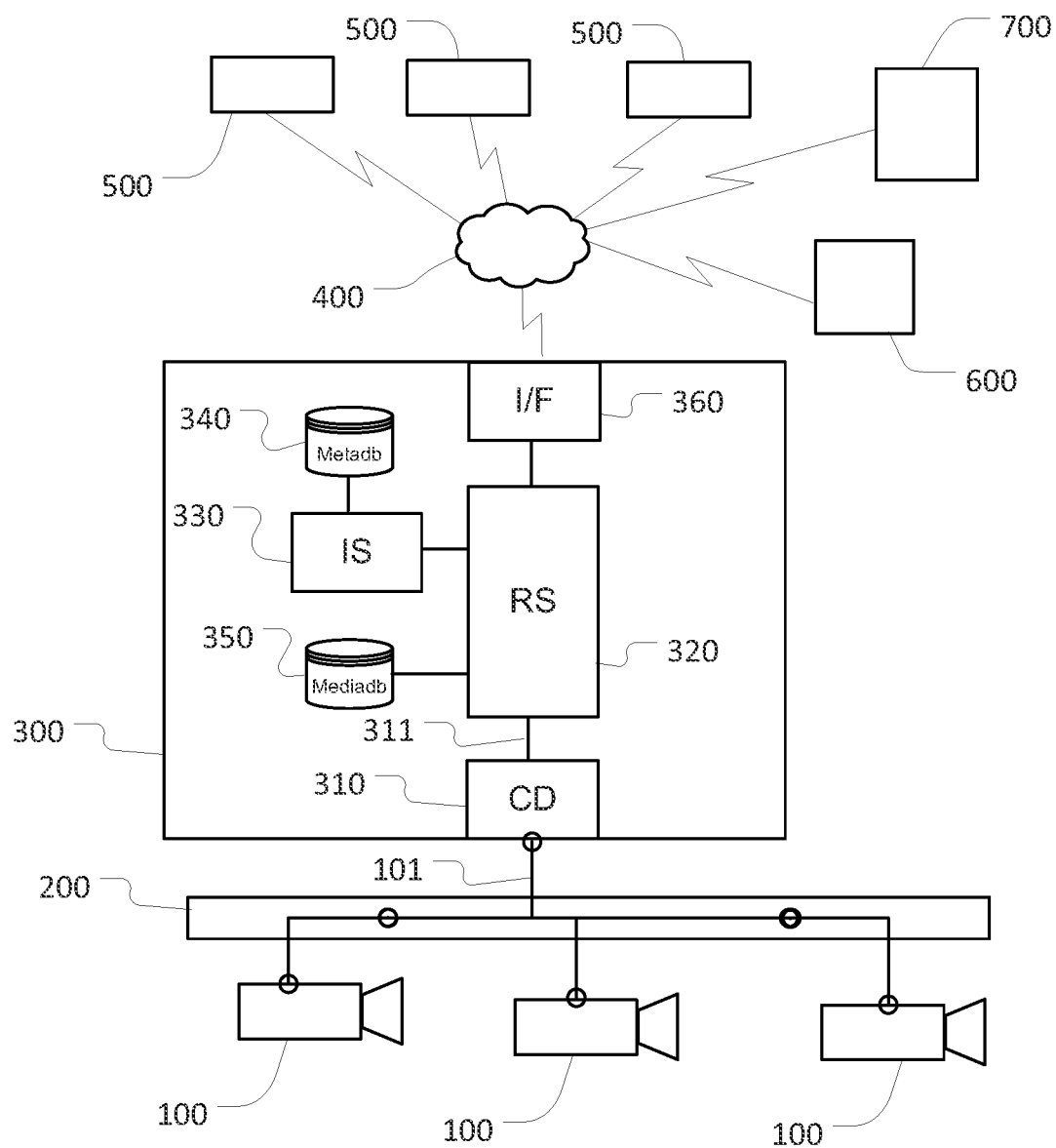
FIG. 1 schematically illustrates an example of a video surveillance system.

FIG. 1 schematically illustrates an example of a video surveillance system.

The video surveillance system comprises a number of video cameras 100, a video management system 300 and a number of digital devices 500. In the example of FIG. 1 as well as in some of the following figures the digital devices are shown as being remote from the video management system, in particular as being executed by a digital device data processing system remote from the video management data processing system on which the video management system is executed. In particular, embodiments are described where the digital device is cloud-based. It will be appreciated, however, that in some embodiments, one or more, or even all, digital devices may be integrated into the video management system or otherwise executed on the same data processing system as the video management system. Optionally, the video surveillance system may comprise additional components, such as a video analytics system 600 and/or other video-receiving systems 700. These may be implemented on a data processing system remote from the video management system, as illustrated in FIG. 1, or they may be executed on the same data processing system as the video management system.

While FIG. 1 illustrates a system with three video cameras, it will be appreciated that other examples may include fewer than three or more than three cameras. Generally, a video surveillance system may include one or a plurality of video cameras. The one or more video cameras are typically distributed across an area where surveillance is desired e.g. across the premises of a facility where surveillance is desired. The number and position of cameras as well as the type of camera to be installed may be selected based on factors such as the level of surveillance desired, the size of the facility and/or the complexity of the layout of the facility.

The video cameras may be conventional video cameras known as such in the art of video surveillance. It will be appreciated that the video surveillance system may include a plurality of video cameras of the same type, i.e. video cameras having the same capabilities, providing the same type of video output, in the same format etc. Alternatively, many examples of video surveillance systems may include cameras of different types, e.g. video cameras having different capabilities, providing video streams of different resolution, in different formats or outputting additional metadata associated with the video. Examples of capabilities of video cameras may include one or more of the following: audio recording, video recording in visible wavelength ranges and/or in infrared wavelength ranges, such as near-infrared wavelength ranges, control functions such as pan or zoom, image processing capabilities, motion detection, etc.

The video cameras 100 are communicatively connected to the video management system 300. To this end, the video cameras 100 may be connected to the video management system via a local area network 200 or in a different suitable manner, e.g. via point-to-point wired and/or wireless connections, or the like. For example, the video cameras may be connected to the video management system via an Ethernet connection. An example of a wireless connection includes a 5G network. It will be appreciated that some examples of video surveillance systems may include additional sensors providing sensor signals and/or media streams different from video streams, such as audio signals, radar signals, Lidar signals, etc.

The video management system 300 receives video streams from the video cameras 100 and, optionally, input signals from other sources. The video management system is configured to store the received video streams in a media repository 350, and provides an interface 360 for accessing the live video streams, and to access video streams stored in the media repository 350. The media repository 350 may be media database or other suitable storage device for storing media content. The video management system may include a user interface allowing users to view the live video and/or store videos and/or to control operation of one or more of the video cameras.

The video management system 300 may be embodied as a software program executed by a suitable data processing system, e.g. by one or more server computers. The data processing system implementing the video management system is often, though not necessarily, installed on the premises of the facility where the video cameras are located, thus avoiding the need for transmitting the video streams from the cameras over public or other communications networks.

The video management system comprises one or more camera drivers 310 for providing interfaces to respective types of video cameras. Different video cameras may provide their video streams in different formats, e.g. using different encoding schemes and/or different network protocols. Similarly, different cameras may provide different interfaces for camera control such as zoom, or pan. Accordingly, the video management system 300 may include a plurality of different camera drivers 310 configured to cooperate with respective camera types. In particular, the camera drivers 310 may implement one or more suitable network protocols and/or other communications standards for communicating with video cameras and/or other surveillance equipment. Examples of such protocols and standards include the Open Network Video Interface Forum (ONVIF) standard and the Real Time Streaming Protocol (RTSP).

The camera drivers 310 further add one or more time stamps to the received video signals 101 so as to ensure that the video streams, which are stored and subsequently supplied by the video management system, include a uniform time stamp. The added time stamp will also be referred to as a canonical time stamp. The canonical time stamp is indicative of the time of receipt, by the video management system, of the video streams 101 from the respective video cameras 100. The camera drivers thus provide uniformly time-stamped input video streams 311, each time-stamped input video stream 311 corresponding to a respective one of the received video streams 101.

The video management system 300 comprises a recording server 320. The recording server may be embodied as a software program module executed by a suitable data processing system, e.g. by one or more server computers. The recording server receives the input video streams 311 originating from the respective video cameras 100 from the corresponding camera drivers 310. The recording server stores the received input video streams in a suitable media storage device, such as a suitable media database. It will be appreciated that the media repository 350 may be part of the video management system 300 or it may be separate from, but communicatively coupled to the video management system. The media repository 350 may be implemented as any suitable mass storage device, such as one or more hard disks or the like. The storing of the received input video streams is also referred to as recording the received input video streams. The recording server may receive additional input signals, such as audio signals, motion detection signals, etc. associated with the input video streams. The additional input signals may originate from the video cameras 100 and/or from other signal sources, such as from additional surveillance sensors. The video management system may store the additional input signals in the media repository 350 and/or in a separate storage device.

The recording server 320 is further configured to selectively provide the live input video streams 311 and/or previously stored input video streams retrieved from the media repository 350 via a suitable interface 360 to one or more external entities 500, 600, 700, respectively.

To this end, the interface 360 may provide a network interface for providing live video streams and/or previously stored video streams via a communications network 400 to one or more digital devices 500, such as cloud-based digital devices. To this end, the interface 360 may be configured to establish respective video tunnels and/or other communications sessions with the digital devices 500. The interface 360 may implement one or more suitable network protocols and/or other communications standards for communicating with other surveillance equipment. Examples of such protocols and standards include the Open Network Video Interface Forum (ONVIF) standard and the Real Time Streaming Protocol (RTSP).

Examples of the operation of the digital devices 500 and the interaction between the video management system and the digital devices will be described in more detail below and with reference to FIGS. 2-7.

Optionally, the interface 360 may implement different communications channels to other types of external entities. Examples of external entities include a video-receiving system 700, which may receive video streams and provide functionality for viewing and/or processing the video streams. Other examples of external entities include a video analytics system 600, which may receive video streams and perform video processing for analysing the video streams. To this end, the video analytics system may perform object detection, object recognition, motion detection and/or other types of video analytics. The video analytics system may create video metadata indicative of the results of the video analytics performed. For example, the video analytics systems may create video metadata indicative of recognized objects in a video stream. The metadata may include information about the spatial and temporal positions of recognised objects in the video stream and/or information about the identity of the recognized object. The analytics systems may store the generated metadata in a suitable metadata repository. In some embodiments, the analytics systems may communicate the generated metadata back to the video management system. The video management system may store the returned metadata in a suitable metadata repository 340, such as a suitable metadata database, which may be separate from or integrated into the media repository 350. To this end, the video management system may include an index server 330. The index server may be embodied as a software program module executed by a suitable data processing system, e.g. by one or more server computers. The index server may receive metadata and store the received metadata in the metadata repository 340. The index server may further index the stored metadata so as to allow faster subsequent search and retrieval of stored metadata. Metadata received from the external analytics systems 600 may be received by the recording server 320 and forwarded to the index server 330. Alternatively or additionally, the index server may receive metadata directly from one or more analytics systems 600.

The interface 360 may implement different types of interfaces. For example, the interface may provide an application interface, e.g. in the form of a software development kit and/or one or more communication protocols, such as a suitable messaging protocol, e.g. SOAP, XML, etc. Accordingly, the interface may operate as a gateway to different types of systems.

The communications network 400 may be the internet or another suitable communications network. It will be appreciated, however, that at least some of the other entities 500, 600 and 700 may reside on the same data processing system as the video management system or on a data processing system connected to the video management system via a local area network, instead.

Figure 2:
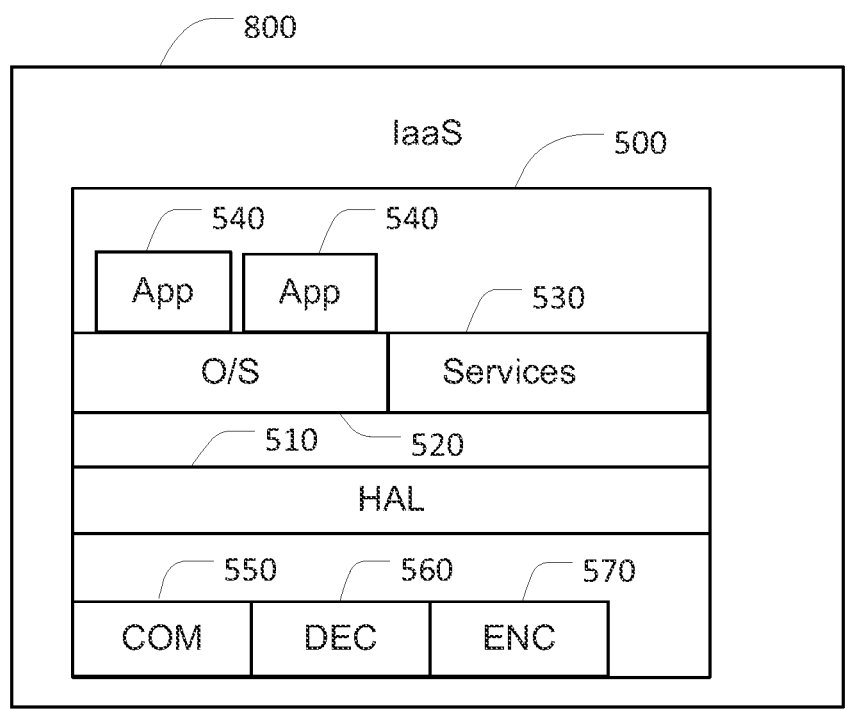
FIG. 2 schematically illustrates an example of a cloud-based digital device emulating an app-enabled video camera.

FIG. 2 schematically illustrates an example of a cloud-based digital device emulating an app-enabled video camera.

The cloud-based digital device 500 may be implemented as a computer program executed on a cloud-based computing platform 800 such as an infrastructure as a service (IaaS) architecture.

The digital device includes a suitable operating system 520 providing an execution platform for one or more user-installed application programs 540. The application programs 540 may be deployed during runtime of the digital device 500, e.g. by obtaining the application programs in an app store or similar application program repository. In some embodiments, the operating system is an Android-based operating system. To this end, the digital device may include a hardware abstraction layer 510 allowing the operating system and/or other software components of the digital device 500 to be executed on the cloud computing architecture 800.

The digital device 500 further comprises a service component 530 configured to provide the application programs 540 with various services, e.g. allowing the application programs to request video streams, e.g. individual frames of video streams, when being executed on the digital device.

The digital device further comprises a communications module 550 allowing the digital device to communicate with the video management system using a suitable network protocol, such as RTSP. The digital device 500 comprises a decoder module 560 configured to decode the received video streams. For example, the decoder module 560 may be configured to receive and decode video streams encoded according to H.264 and/or H.265 and/or another suitable encoding standard for encoding video streams. The digital device 500 may thus allow one or more application programs 540 executed by the digital device to access the received and decoded video stream. The application programs may process the video stream or individual frames of the video stream. Some application programs may process the video stream and generate a modified video stream. Alternatively or additionally, one or more of the application programs may process the received video stream so as to create metadata based on the video streams.

To this end, the digital device 500 may be configured to host a variety of different application programs. Examples of application programs include application programs that process at least a part of a video stream, e.g. one or more frames of a video stream, so as to create metadata associated with the video stream, e.g. metadata indicative of one or more detected properties or features of the video stream, e.g. so as to perform object detection, event detection, motion detection and/or the like. Some or more of these processing techniques may comprise the application of machine learning techniques. One example of an application program may add GPS location data to a place within field of view depicted in the video, e.g. so as to identify a position of a crime. Other examples of video processing may include detecting or otherwise adding metadata regarding a crime, such as creating data from various cameras stitched together. Accordingly, in some embodiments, a digital device may be configured to receive multiple video streams, and generate metadata based on a combination of the multiple videos.

Alternatively, an application program on a digital device may call one or more physical video cameras which are tethered to that digital device (or to which the digital device is tethered to) to enquire about their GPS location. This allows for instance to search, in an application program, for physical video cameras by GPS coordinates (which physical video cameras would otherwise be missed when searching by GPS location). Knowing the GPS location of a physical video camera may also allow an application program to create useful correlations, such as GPS correlation to depth of field (or DOP, which may for instance be calculated by that or another application program). GPS location is generally more useful when it relates to outdoor physical video cameras.

Other examples of application programs include application programs that process at least a part of a video stream so as to modify the video stream, i.e. so as to create at least a part of a processed video stream. Examples of such processing include a process for image/video enhancement and/or the like. For example, an application program may upscale a low-resolution video to a higher-resolution video and/or enhance image quality and/or create super resolution from poor quality video.

The communications module is further configured to allow the digital device 500 to operate as a video server on a computer network, i.e. to provide video streams to a video stream receiving system. In particular, the digital device may output video streams received from the video management system and/or it may output processed video streams, i.e. video streams based on the received video stream but modified by one or more of the application programs 540. To this end, the digital device comprises an encoder module 570 configured to encode the video stream to be output by the digital device. For example, the encoder module 570 may be configured to encode video streams according to H.264 and/or H.265 and/or another suitable encoding standard for encoding video streams.

The digital device 500 is thus configured to emulate at least one physical video camera which may be recognised on a computer network as a video camera and to provide suitably encoded video streams to external video-signal-receiving systems via the computer network. Generally, emulating a video camera comprises supporting APIs such as those defined in RTSP, ONVIF and/or the like, conventionally supported by video cameras, in particular APIs for retrieving video streams, for making camera settings, and/or the like. In particular, the digital device 500 is configured to emulate at least one app-enabled video camera, which allows application programs to be deployed and which outputs results of the video processing performed by the application programs on the video stream. Instead of operating on video streams directly obtained by an image sensor, as is the case in a physical video camera, the digital device operates on a video stream received from the video management system disclosed herein.

Figure 3:
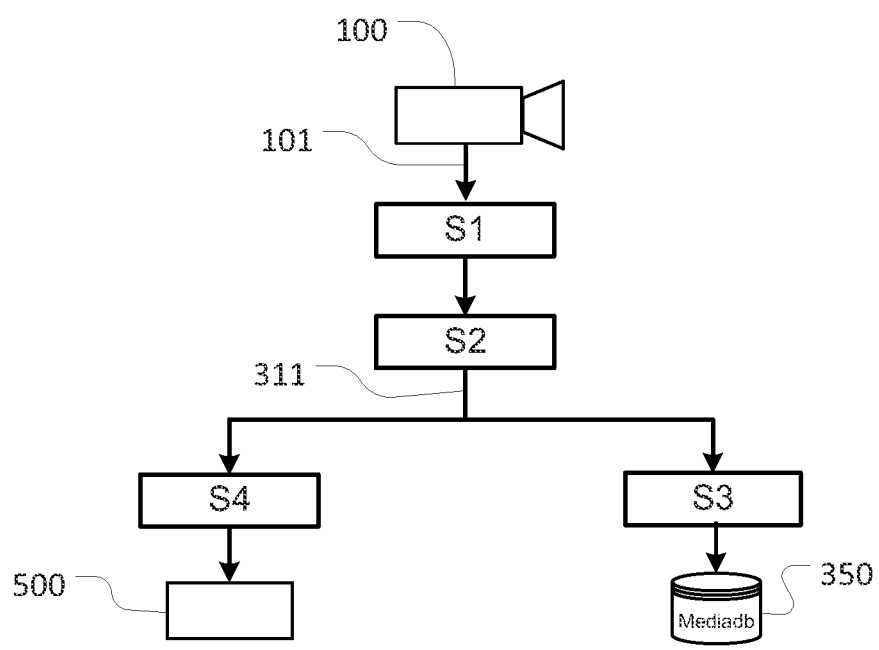
FIG. 3 schematically illustrates an example of a computer-implemented video management process.

FIG. 3 schematically illustrates an example of a computer-implemented video management process. The process of FIG. 3 may e.g. be performed by the video management system of the video surveillance system of FIG. 1.

In step S1, the process receives a video stream 101 from a video camera 100.

In step S2, the process adds a time stamp to the received video stream, the time stamp being indicative of the time of receipt of the video stream by the video management system, thus resulting in a time-stamped input video stream 311. It will be appreciated that the process may add multiple time stamps to a received video stream, e.g. so as to indicate the time of receipt of individual parts, e.g. individual frames of the video stream. In some embodiments, time stamps are added to some but not all frames, e.g. only to an initial frame and/or to one or more otherwise selected frames. It will further be appreciated that, depending on the type of camera 100, the received video stream 101 may or may not include a time-stamps. However, regardless of the presence of any time stamps in the received video stream 101, the added time stamp of the input video stream 311 will subsequently be used by the video management system as a canonical time stamp, as will be described in greater detail below.

In step S3, the process stores the time-stamped input video stream 311 in a media repository 350.

In step S4, concurrently to the storage of the time-stamped input video stream, the process provides the time-stamped input video stream 311 as a live video to one or more digital devices as described herein.

It will be appreciated that some embodiments of embodiments a video management system may be capable of concurrently receiving and processing multiple video streams, e.g. video streams from different video cameras.

Figure 4:
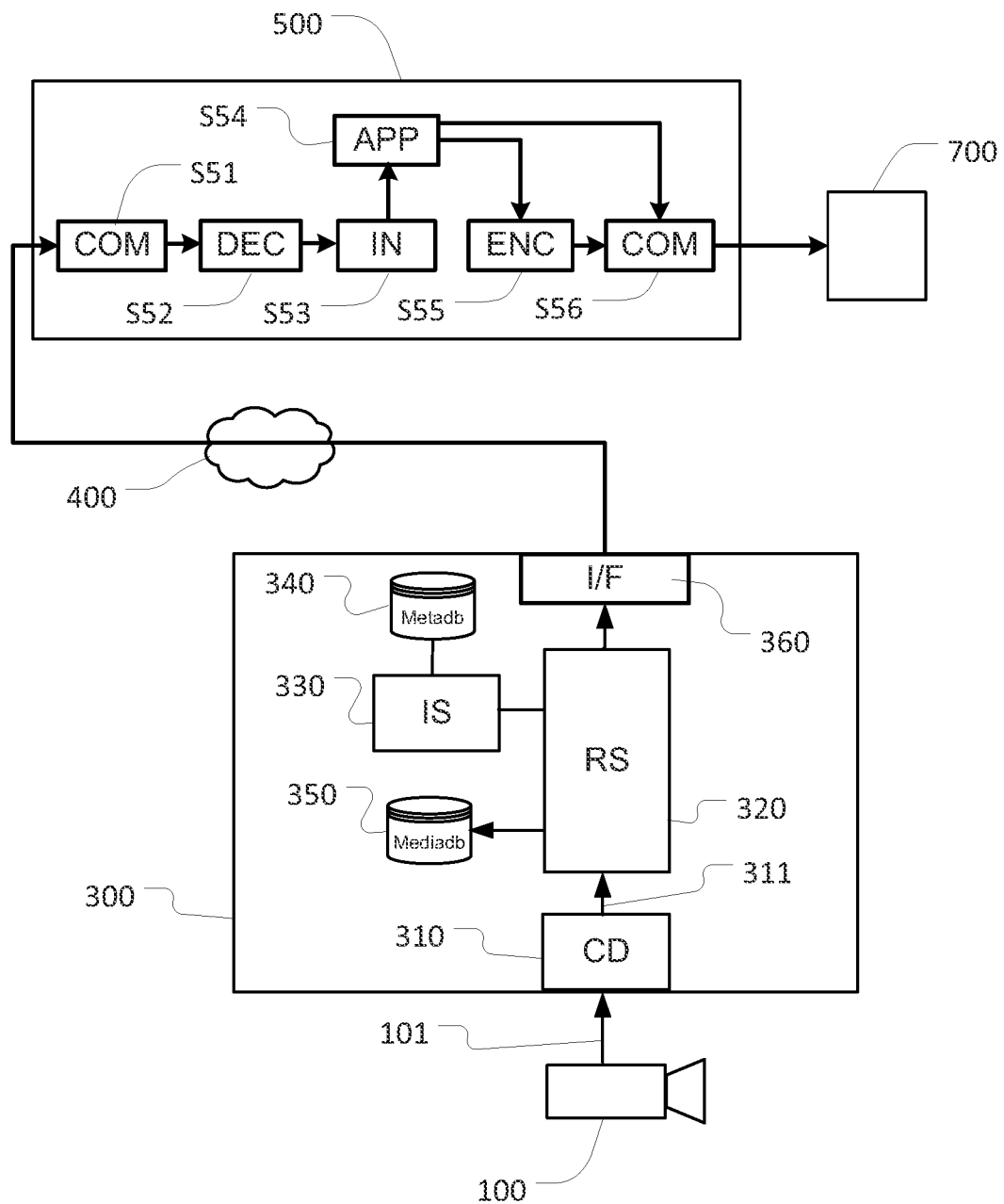
FIGS. 4-7 schematically illustrate examples of a video management and video processing process.

FIG. 4 schematically illustrate an example of a video management and video processing process performed by the video surveillance system of FIG. 1 including the digital device 500 of FIG. 2.

The camera driver 310 of the video management system 300 receives a video stream 101 from a video camera 100. The camera driver 310 adds a time stamp to the received video stream, e.g. as described in connection with step S2 of the process of FIG. 2.

The recording server 320 receives the time-stamped input video stream 311 from the camera driver and stores the time-stamped input video stream in the media repository 350. Concurrently, the recording server 320 feeds the time-stamped input video stream 311 via interface 360 as a live video to one or more digital devices 500.

In step S51, the communications module of the digital device receives the time-stamped video stream from the video management system 300 via communications network 400.

In step S52, the decoder module of the digital device 500 decodes the video stream.

In step S53, the digital devices provides at least a part of the decoded video stream, e.g. individual frames of the video stream, to one or more application programs deployed on the digital device. It will be appreciated that, in some embodiments, the digital device may provide an encoded video stream to one or more of the application programs, i.e. the digital device may provide the received video stream without prior decoding.

In step S54 the application program processes at least the part of the video stream and returns a modified, i.e. processed video stream, and/or metadata pertaining to the video stream.

In step S55, the encoder module of the digital device 500 encodes the processed video stream. Alternatively, if the application program does not return any processed video stream, the encoder module may re-encode the originally received video stream.

In step S56, the communications module sends the encoded video stream and/or the metadata generated by the application program to an external data processing system 700. The external data processing system may thus receive the, optionally processed, video stream from the digital device 500 in the same manner as it would otherwise receive a video stream from a video camera, in particular from an app-enabled camera.

It will be appreciated that some embodiments of a video management system may be capable of concurrently receiving and processing multiple video streams, e.g. video streams from different video cameras and/or video streams forwarded to respective digital devices.

Figure 5:
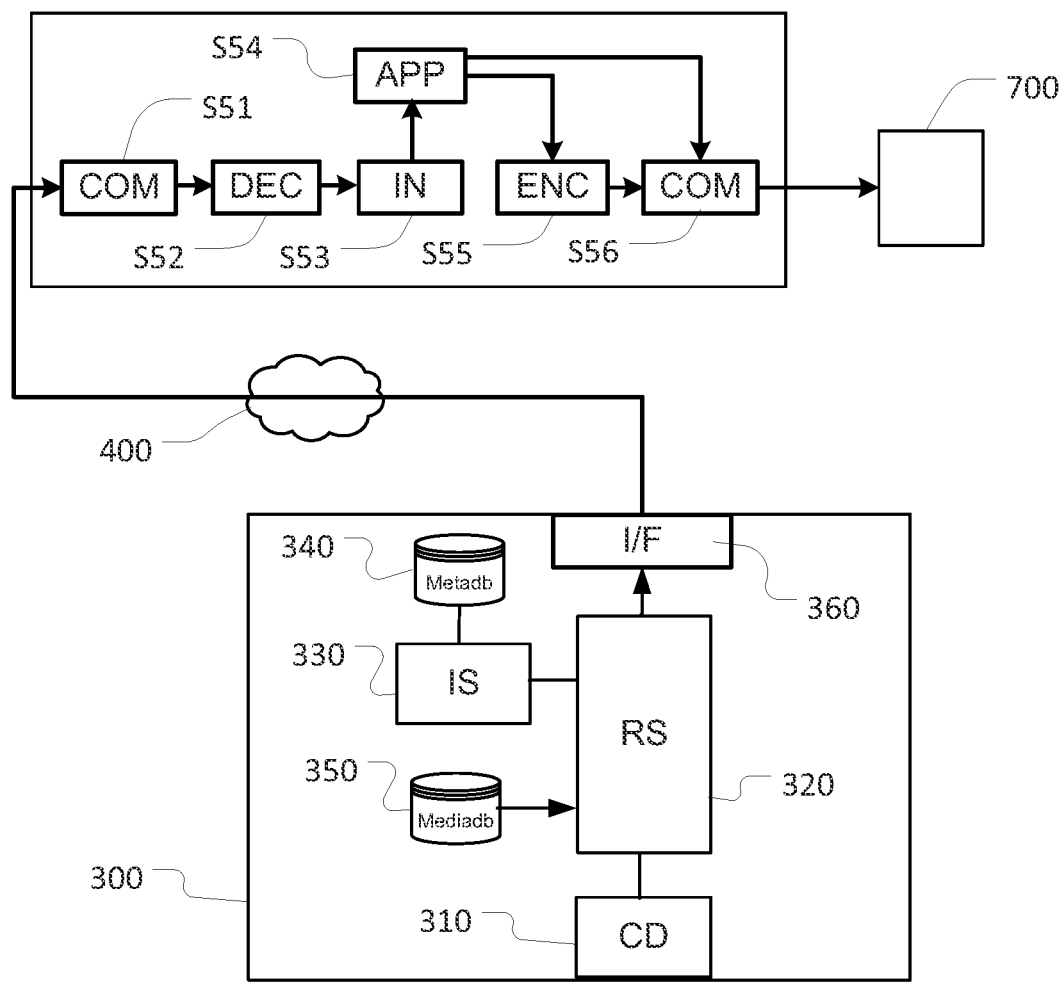

FIG. 5 schematically illustrate another example of a video management and video processing process performed by the video surveillance system of FIG. 1 including the digital device 500 of FIG. 2.

The process of FIG. 5 is similar to the process of FIG. 4, except that, in the example of FIG. 5, the video management system 300 transmits a previously stored video stream to the digital device instead of a live video stream that is currently received from a video camera.

To this end, the recording server 320 retrieves a previously stored video stream from the media repository 350 and forwards the retrieved video stream via interface 360 to the digital device 500 via the communications network 400, as was described in connection with FIG. 4.

In the present example, as the transmitted video stream is a previously stored video stream, the video stream retrieved from the media repository 350 is date stamped according to the time of recording of the video stream. The recording server 320 may forward the retrieved video stream to the digital device 500 with the original canonical date stamp. Alternatively, the recording server 320 may replace the canonical date stamp with another, modified time stamp corresponding to the current time at which the recording server forwards the previously stored video stream. Accordingly, in the latter case, the digital device 500 receives at least one video stream that emulates a live video stream that is currently captured by at least one physical video camera. The digital device 500 receives, decodes and provides the at least one video stream to one or more application programs and forwards a re-encoded, processed video stream and/or metadata pertaining to the video stream to an external data processing system, all as described in connection with FIG. 4.

Accordingly, the video stream output by the digital device 500 and/or the metadata output by the digital device emulate at least one output of an app-enabled camera currently capturing a video.

Figure 6:
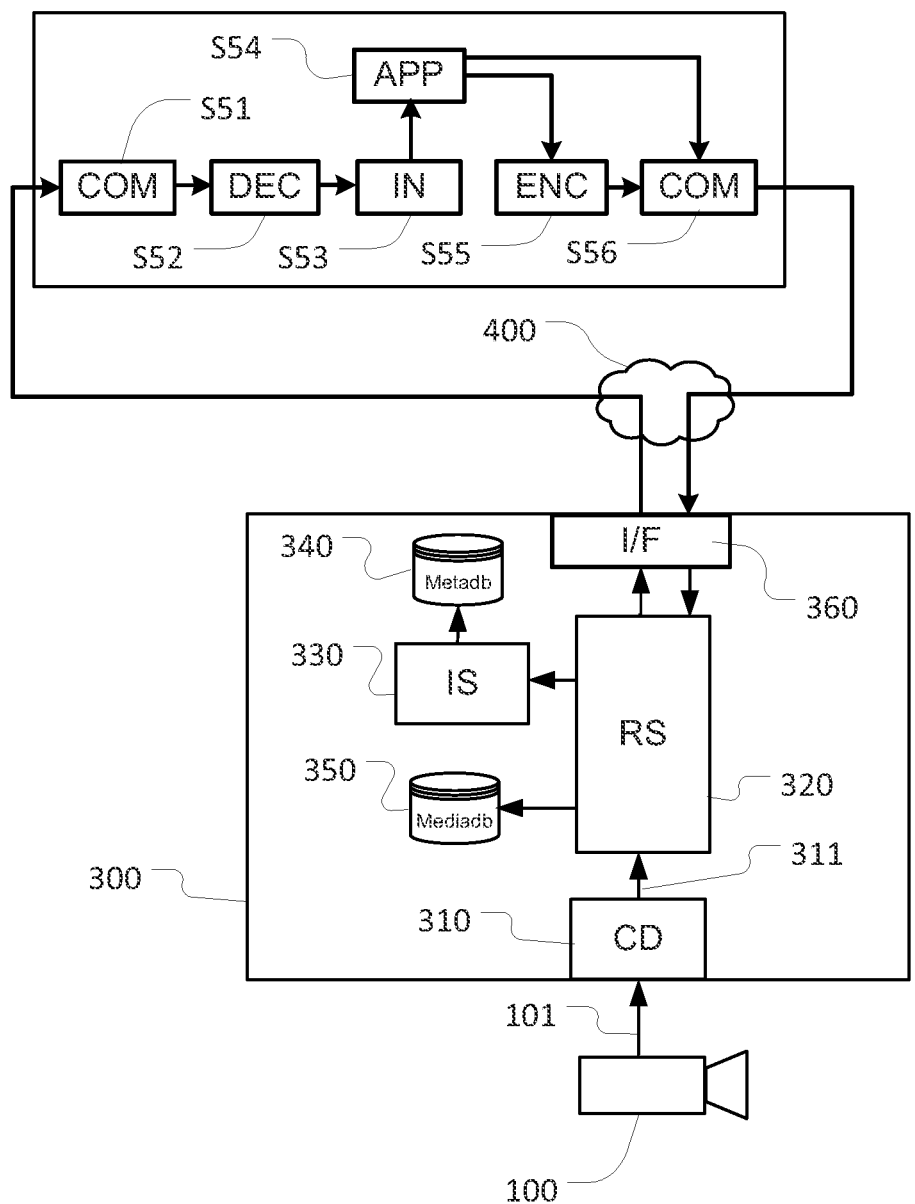

FIG. 6 schematically illustrate yet another example of a video management and video processing process performed by the video surveillance system of FIG. 1 including the digital device 500 of FIG. 2.

The process of FIG. 6 is similar to the process of FIG. 4, except that, in the example of FIG. 6, the digital device 500 returns its output to the video management system 300 instead of transmitting it to an external data processing system. It will be appreciated that, in other examples, the digital device may forward its output to an external data processing system and, concurrently, return the output to the video management system 300.

In any event, in the example of FIG. 6, the digital device 500 sends the processed video stream and/or metadata pertaining to the video stream via the communications network 400 back to the video management system 300. In particular, the digital device may return the processed video stream and/or the metadata through the same video tunnel or otherwise during the same communications session that is used for forwarding the video stream from the video management system 300 to the digital device 500. Accordingly, upon receipt of the processed video stream and/or the metadata, from the digital device 500, via the interface 360, the recording server 320 may associate the received processed video stream and/or the metadata to the video stream that has been fed during the same session to the digital device. Accordingly, the recording server may store the metadata and or the processed video stream in the metadata repository 340 and/or the media repository 350, respectively, in association with the original video stream. In particular, the recording server may synchronize the respective data streams based on the canonical time stamps.

Figure 7:
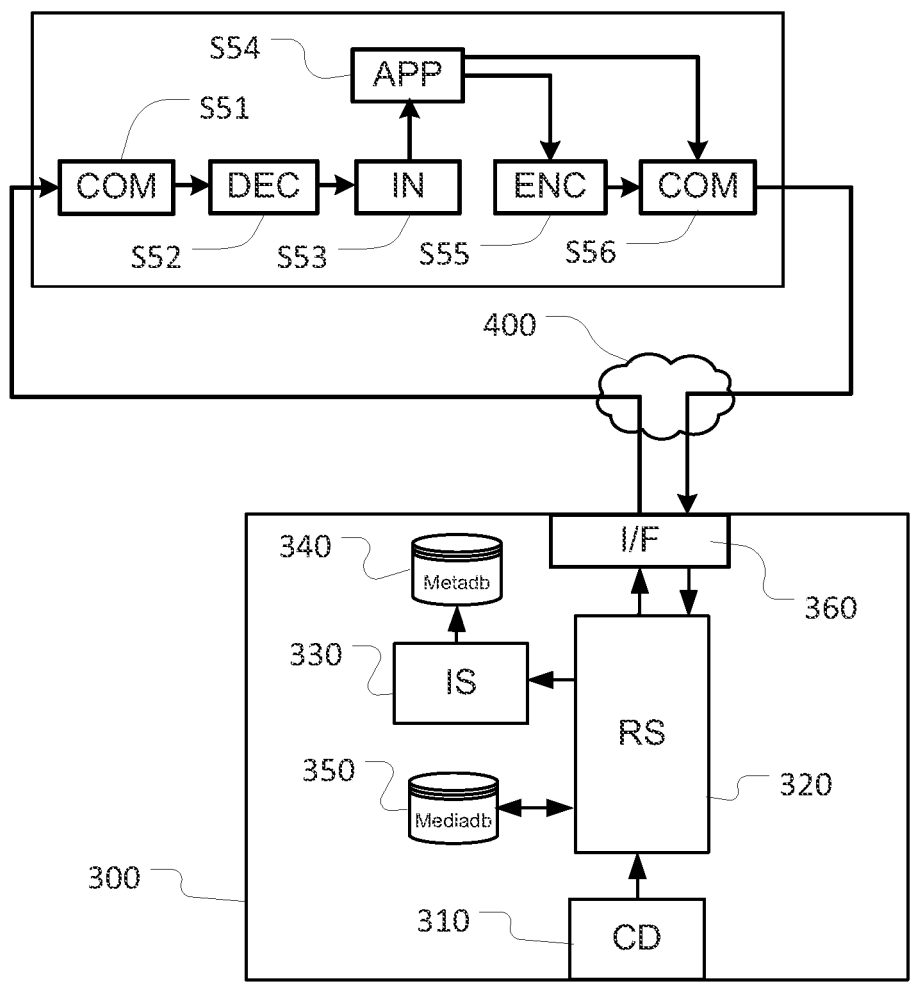

Similarly, FIG. 7 schematically illustrate yet another example of a video management and video processing process performed by the video surveillance system of FIG. 1 including the digital device 500 of FIG. 2.

The process of FIG. 7 is similar to the process of FIG. 5, except that, in the example of FIG. 7, the digital device 500 returns its output to the video management system 300 instead of transmitting it to an external data processing system. It will be appreciated that, in other examples, the digital device may forward its output to an external data processing system and, concurrently, return the output to the video management system 300.

In any event, in the example of FIG. 7, the digital device 500 sends the processed video stream and/or metadata pertaining to the video stream via the communications network 400 back to the video management system. In particular, the digital device may return the processed video stream and/or the metadata through the same video tunnel or otherwise during the same communications session that is used for forwarding the video stream from the video management system 300 to the digital device 500. Accordingly, upon receipt of the processed video stream and/or the metadata, from the digital device, via the interface 360, the recording server 320 may associated the received processed video stream and/or the metadata to the video stream that has been fed during the same session to the digital device. Accordingly, the recording server may store the metadata and or the processed video stream in the metadata repository 340 and/or the media repository 350, respectively, in association with the original video stream. In particular, the recording server may synchronize the respective data streams.

To this end, the recording server 320 retrieves a previously stored video stream from the media repository 350 and forwards the retrieved video via interface 360 to the digital device 500 via the communications network 400, as was described in connection with FIG. 5. In particular, the recording server may replace the canonical date stamp of the retrieved video stream with another, modified time stamp corresponding to the current time at which the recording server forwards the previously stored video stream. The recording server may maintain information about the relationship, in particular the time lag, between the canonical time stamp and the modified time stamp for use during subsequent resynchronization. Accordingly, the digital device 500 receives a video stream that emulates at least one live video stream that is currently captured by a video camera. The digital device 500 receives, decodes and provides the video stream to one or more application programs and forwards a re-encoded, processed video stream and/or metadata pertaining to the video stream to an external data processing system, all as described in connection with FIG. 5.

Upon receipt of the returned processed video stream and/or the metadata from the digital device via the same video tunnel or otherwise as part of the same communications session, the recording server may re-synchronize the processed video stream and/or metadata with the canonical time stamp based on the known relation between the modified time stamp and the canonical time stamp. Accordingly, the recording server may again replace the modified time stamp with the canonical time stamp and store the processed video and/or metadata time-stamped with the canonical time stamp.

Embodiments of the method steps described herein as being carried out by a processing unit can be implemented by means of hardware comprising several distinct elements, and/or at least in part by means of a suitably programmed microprocessor. In the apparatus claims enumerating several means, several of these means can be embodied by one and the same element, component or item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

The invention claimed is:

1. A video surveillance system comprising a video management system and one or more computer-implemented digital devices, each of the one or more digital devices being configured to emulate at least one physical electronic device for sending video streams and/or video metadata via a computer network to a video management system, wherein each of the one or more digital devices is configured to emulate at least one physical electronic device by providing one or more interfaces allowing the video management system to communicate with that digital device as if that digital device were the said at least one physical electronic device by retrieving video streams, wherein the video management system comprises:
   an input interface for receiving one or more video stream from respective one or more video cameras and/or one or more other video sources,
   a processing unit configured to receive one or more input video streams from the input interface, each input video stream corresponding to a respective one of the received video streams, and to store the input video streams in a video repository, such that the received video streams are processed by the video repository prior to sending the input video streams to the one or more digital devices, and
   an output interface configured to send, via a computer network, one or more of the input video streams and/or one or more of the stored video streams to the one or more digital devices after the input video streams and/or the one or more of the stored video streams are stored in the video repository,
   wherein at least one of the one or more digital devices is configured to:
   receive, via the computer network, the one or more of the input video streams and/or the one or more of the stored video streams sent from the video management system,
   provide an execution environment for one or more user-installed application programs, the execution environment allowing the one or more user-installed application programs to process at least a part of the received video stream resulting in a processed video stream and/or in video metadata associated with the received video stream, and to
   output, via the said one or more interfaces of that digital device and the computer network, the processed video stream and/or the video metadata in return to the video management system.

2. The video surveillance system according to claim 1, wherein the video management system is configured to concurrently send the input video streams to at least one of the one or more digital devices and to store the input video streams in the video repository.

3. The video surveillance system according to claim 2, wherein the at least one of the one or more digital devices comprises a video decoder module configured to decode the received video stream.

4. The video surveillance system according to claim 3, wherein the at least one of the one or more digital devices is configured to provide an application interface allowing each of the application programs to receive at least a part of the decoded video stream.

5. The video surveillance system according to claim 3, wherein the at least one of the one or more digital devices comprises a video encoder module configured to re-encode and output the processed video stream.

6. The video surveillance system according to claim 1, wherein the at least one of the one or more digital devices comprises a communications module configured to establish a communications session with the video management system, and to receive a video stream via the established communications session.

7. The video surveillance system according to claim 6, wherein the at least one of the one or more digital devices is configured to transmit the processed video stream and/or the video metadata to the video management system during said established communications session.

8. The video surveillance system according to claim 1, wherein at least one of the one or more digital devices comprises a video server component configured to operate as a video server operable to provide a video stream and/or video metadata to the video client component using a network control protocol configured for use in communications systems to control streaming media.

9. The video surveillance system according to claim 1, wherein the input interface comprises one or more camera drivers, each camera driver configured to receive video streams from at least one type of camera; wherein each camera driver is configured to add one or more time stamps to the received video stream so as to provide the input video stream as a time-stamped input video stream; and wherein the video management system is configured to store the input video stream with the added time stamp as a canonical time stamp.

10. The video surveillance system according to claim 9, wherein the video management system is configured, when feeding a previously stored video stream to a digital device, to replace the canonical time stamp with a modified time stamp, the modified time stamp corresponding to a current time.

11. The video surveillance system according to claim 10, wherein the video management system is configured, when receiving a processed video stream and/or video metadata from a digital device, to determine whether the received processed video stream and/or video metadata corresponds to a previously stored video stream, and to selectively add a time stamp to the received processed video stream and/or the received video metadata, the added time stamp corresponding to the canonical time stamp of the previously stored video stream.

12. The video surveillance system according to claim 1, wherein the video management system and at least one of the one or more digital devices is configured to receive and process one or more additional media streams and/or additional sensor data.

13. The video surveillance system according to claim 12, where the at least one of the one or more digital devices is configured to provide the one or more additional media streams and/or additional sensor data to one or more of the application programs hosted by the digital device so as to allow the one or more application programs to process the additional media streams in combination with the video stream received by the at least one of the one or more digital devices.

14. A computer-implemented video management process, comprising:

receiving one or more video streams from respective one or more video cameras and/or other video sources, storing one or more input video streams, each input video stream corresponding to a respective one of the received video streams, in a video repository, such that the received video streams are processed by the video repository prior to sending the input video streams to the one or more digital devices, and sending from a video management system, via a computer network, one or more of the input video streams and/or one or more of the stored video streams to the one or more digital devices after the input video streams and/or the one or more of the stored video streams are stored in the video repository, each of the one or more digital devices being configured to emulate at least one physical electronic device, and to send video streams and/or video metadata via a computer network to a video management system, wherein each of the one or more digital devices is configured to emulate at least one physical electronic device by providing one or more interfaces allowing the video management system to communicate with that digital device as if that digital device were the said at least one physical camera by retrieving video streams and wherein each of the one or more digital devices is further configured to output, via the one or more interfaces, the said video streams and/or video metadata to the said video management system.

\* \* \* \* \*